(12) United States Patent
Michaeli et al.

(10) Patent No.: US 10,427,875 B2
(45) Date of Patent: Oct. 1, 2019

(54) CONVEYOR SYSTEM FOR CONVEYING MATERIALS TO BE CONVEYED

(71) Applicants: THYSSENKRUPP INDUSTRIAL SOLUTIONS AG, Essen (DE); thyssenkrupp AG, Essen (DE)

(72) Inventors: Gerhard Michaeli, Sankt Ingbert (DE); Franz Wolpers, Kirkel (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/080,268

(22) PCT Filed: Feb. 21, 2017

(86) PCT No.: PCT/EP2017/053852
§ 371 (c)(1),
(2) Date: Aug. 27, 2018

(87) PCT Pub. No.: WO2017/144434
PCT Pub. Date: Aug. 31, 2017

(65) Prior Publication Data
US 2019/0071252 A1 Mar. 7, 2019

(30) Foreign Application Priority Data
Feb. 25, 2016 (DE) .................... 10 2016 203 002

(51) Int. Cl.
*B65G 15/08* (2006.01)
*B65G 39/10* (2006.01)
(Continued)

(52) U.S. Cl.
CPC ............ *B65G 15/08* (2013.01); *B65G 11/206* (2013.01); *B65G 39/10* (2013.01); *B65G 47/44* (2013.01);
(Continued)

(58) Field of Classification Search
CPC ...... B65G 39/10; B65G 39/125; B65G 15/08; B65G 2201/0276
(Continued)

(56) References Cited

U.S. PATENT DOCUMENTS 756,519 A * 5/1904 Olson .................... B65G 15/08
198/826
2,094,741 A * 10/1937 Grussendorf ........... E01F 9/617
359/528
(Continued)

FOREIGN PATENT DOCUMENTS

DE 8326408 U 2/1984
DE 4028469 A 3/1992
(Continued)

OTHER PUBLICATIONS

English Translation of International Search Report issued in PCT/EP2017/053852, dated Apr. 19, 2017 (dated Apr. 28, 2017).

*Primary Examiner* — James R Bidwell
(74) *Attorney, Agent, or Firm* — thyssenkrupp North America, Inc.

(57) ABSTRACT

A conveyor system for conveying material may include a conveyor belt, a feeding mechanism for feeding materials to be conveyed onto the conveyor belt, and a belt system in which the conveyor belt is guided. The belt system may include a first belt-shaping device with which the conveyor belt can be shaped into a U shape. Thus the material to be conveyed may be brought from a substantially flat shape into the U shape. A second belt-shaping device of the belt system may shape the conveyor belt downstream of the feeding mechanism in the conveying direction to form a closed tube. The feeding mechanism may include a catching region configured such that material to be conveyed accumulates therein and forms an impact surface onto which the material to be conveyed can be fed.

18 Claims, 7 Drawing Sheets

(51) Int. Cl.
*B65G 47/44* (2006.01)
*B65G 11/20* (2006.01)
(52) U.S. Cl.
CPC .. *B65G 2201/042* (2013.01); *B65G 2201/045* (2013.01)
(58) Field of Classification Search
USPC ................................. 198/819, 824, 825, 826
See application file for complete search history.

(56) References Cited

U.S. PATENT DOCUMENTS

| | | | | |
|---|---|---|---|---|
| 3,880,275 | A | * 4/1975 | Fischer | B65G 23/22 |
| | | | | 198/825 |
| 2004/0134759 | A1 | * 7/2004 | Tschantz | B65G 15/08 |
| | | | | 198/819 |
| 2004/0182673 | A1 | 9/2004 | Baller | |
| 2008/0283368 | A1 | 11/2008 | Brewka | |
| 2013/0334013 | A1 | * 12/2013 | Enshu | B65G 15/08 |
| | | | | 198/819 |

FOREIGN PATENT DOCUMENTS

| | | | | |
|---|---|---|---|---|
| DE | 20121252 | U | 7/2002 | |
| EP | 0718218 | A | 6/1996 | |
| GB | 873717 | A | 7/1961 | |
| GB | 2094741 | A | 9/1982 | |
| JP | S6133406 | A | 2/1986 | |
| JP | 6-183531 | * | 7/1994 | ............ B65G 15/08 |
| WO | 2016024428 | A | 2/2016 | |

\* cited by examiner

Fig. 4

CONVEYOR SYSTEM FOR CONVEYING MATERIALS TO BE CONVEYED

CROSS REFERENCE TO RELATED APPLICATIONS

This application is a U.S. National Stage Entry of International Patent Application Serial Number PCT/EP2017/053852, filed Feb. 21, 2017, which claims priority to German Patent Application No. DE 10 2016 203 002.7, filed Feb. 25, 2016, the entire contents of both of which are incorporated herein by reference.

FIELD

The present disclosure generally relates to conveyor systems, including conveyors with belts and feeding mechanisms and methods of operating conveyors.

BACKGROUND

Conveyor systems are customarily used for transporting materials to be conveyed, such as, for example, bulk material, rock or sand from quarrying. For conveying materials over a steep section or during the conveying of hazardous materials, use is made of tubular conveyors, wherein the conveyor belt is shaped to form a tube and surrounds the materials to be conveyed.

DE 40 28 469 A1 discloses a feeding mechanism for feeding materials to be conveyed onto a conveyor belt, wherein the conveyor belt is opened from its shape as a circumferentially closed conveyor tube into a U shape for filling purposes and, after the filling, is shaped again to form a circumferentially closed conveyor tube. Said feeding mechanism is therefore suitable to be loaded at any desired displaceable position along a section. The conveyor belt here is intended to be pretensioned in such a manner that, after the U-shaped opening of the conveyor belt, the latter is automatically shaped to form a conveyor tube. The closed conveyor tube is opened into a U shape by expanding elements of the belt system engaging on the inner surface, which faces the materials to be conveyed, of the conveyor belt and spreading open the inner surface. The materials to be conveyed are input by means of a funnel from the upwardly open side of the U-shaped conveyor belt. Subsequently, the conveyor belt is closed around the entire circumference to form the conveyor tube.

A problem of material feeding of this type onto a conveyor belt which is shaped to form a conveyor tube resides in the fact that the materials to be conveyed comprise small material parts and large material parts. The large material parts have to be suitably treated here so that there is the possibility of shaping the conveyor belt to form a conveyor tube without the conveyor belt colliding with the large material parts. Large material parts may be formed here in an elongate manner, in particular if they have been processed with a rotary breaker. These what are referred to as "fish" are large material parts which are formed in an elongate manner and can reach sizes with a main longitudinal direction that are larger than the diameter of the shaped conveyor tube.

In addition, large material parts lead to considerable loadings of the conveyor belt and of the belt-guiding devices, and therefore these may even be damaged if the large material parts pass directly onto the conveyor belt. As little loading as possible of the conveyor belt is desirable, however.

Thus a need exists for a conveyor device that is designed in such a manner that high loadings of the conveyor belt and of the belt-guiding device are prevented and damage is minimized.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, a conveyor system for conveying materials to be conveyed comprises a conveyor belt, a feeding mechanism for feeding materials to be conveyed onto the conveyor belt, a belt system in which the conveyor belt is guided, wherein the belt system comprises a first belt-shaping device with which the conveyor belt is shaped from a substantially flat shape into a U shape until the feeding mechanism is reached, and therefore the materials to be conveyed can be brought into the U shape. The U shape has, in the conveying direction, a cross section which is constant with respect to the conveying direction, and the U shape is formed with two limbs and a base connecting the limbs such that the limbs are at an acute angle with respect to each other in the cross section of the conveyor belt, wherein the base comprises the angle apex, and wherein the belt system comprises a second belt-shaping device with which the conveyor belt can be shaped in the conveying direction after the feeding mechanism to form a closed tube. A substantially flat shape of the conveyor belt means here that the conveyor belt running off from a belt-deflecting drum may comprise small bulges. This is firstly because the conveyor belt coming from the belt-deflecting drum has a flowing profile to the first belt-shaping device. Secondly, because the center region of the belt-deflecting drum may have a slightly different diameter than the edge region. The conveyor belt is preferably completely flat when it is deflected by the belt-deflecting drum and guided to the first belt-shaping device. In addition, the feeding mechanism comprises a catching region which is designed in such a manner that materials to be conveyed accumulate therein and form an impact surface onto which the materials to be conveyed can be fed. The collecting region can also be an impact surface which does not consist of materials to be conveyed. The belt system comprises a plurality of belt-shaping devices which are arranged one behind another in the conveying direction and are designed in such a manner that the conveyor belt guided therein can be shaped at least by means of the first belt-shaping device first of all to form a U shape and subsequently at least by means of the second belt-shaping device to form a closed tube. In particular, each belt-shaping device comprises at least three rollers which are arranged relative to one another in such a manner that the conveyor belt guided thereon has a U shape or a tubular shape.

An advantageous embodiment of the invention therefore makes provision for only the rollers which are arranged on that surface of the conveyor belt which faces away from the materials to be conveyed to shape the conveyor belt into the U shape or the tubular shape. By means of the substantially flat shape of the conveyor belt at the beginning, the conveyor belt does not have any pretension which necessitates an engagement of expanding elements, for example expanding rollers, on the inner surface, which faces the materials to be conveyed, of the conveyor belt. This embodiment of the conveyor system therefore constitutes a cost-effective and low-maintenance solution of the object because of the few components which are required. In this embodiment of the conveyor system, the belt does not have to be so flexible or curvature-generating that, in the case of the U-shaped curvature of the central region, the two edge regions automatically lie in a folded-in manner.

According to a preferred embodiment, the second belt-shaping device of the conveyor system comprises at least three rollers, preferably four to five rollers, particularly preferably six rollers.

The feeding mechanism is preferably fitted in a stationary manner and arranged above the conveyor belt such that materials to be conveyed can be fed onto the U-shaped conveyor belt by means of the feeding mechanism. In the region after the feeding mechanism in the conveying direction, the conveyor belt has, at least in regions, a closed, tubular form, wherein the materials to be conveyed are arranged within the tubular conveyor belt and are surrounded, in particular completely, by the latter.

The materials to be conveyed are fed into the feeding mechanism, for example, by a conveyor device which is arranged above the conveyor belt and has a belt conveyor. For this purpose, the stationary feeding mechanism is arranged below the discharge end of the belt conveyor in such a manner that materials to be conveyed drop from the belt conveyor into the feeding mechanism. As already mentioned, the belt conveyor is, for example, a substantially flat belt which is guided about a belt-deflecting drum and on which the materials to be conveyed rest.

The feeding mechanism is, for example, a slideway which comprises a collecting region which is designed in such a manner that materials to be conveyed accumulate therein and form an impact surface onto which the materials to be conveyed can be fed. The impact surface is preferably fitted below the discharge end of the belt conveyor above the conveyor belt such that materials to be conveyed drop from the discharge end onto the impact surface. The collecting region is arranged in the feeding mechanism in such a manner that materials to be conveyed which drop from above into the feeding mechanism pass into the collecting region and accumulate therein. The materials to be conveyed accumulate in the collecting region and form an impact surface which can be acted upon by materials to be conveyed. The feeding mechanism extends in particular in the conveying direction of the conveyor belt and comprises, for example, a box-shaped upper region with a rectangular cross section. A side of the box-shaped region that extends in the conveying direction of the conveyor belt preferably forms the collecting region. In the box-shaped region, for example, an opening is arranged at which preferably at least two vertical wall elements which point in the direction of the conveyor belt are connected. The feeding mechanism comprises, for example, a plurality of catching regions which are arranged in particular with respect to one another in such a manner that the materials to be conveyed which have accumulated in the collecting regions form an impact surface. The impact surface is preferably formed in a substantially flat manner.

According to an unexpected finding of the inventors, an impact surface consisting of materials to be conveyed which have accumulated in the catching device permits an optimum pre-orientation of the materials to be conveyed, in particular of elongate lumps of material (fish). This assists the orientation of the elongate lumps of material in the U-shaped belt in the direction of the conveyor belt or reduces the risk of lumps of materials to be conveyed lying transversely with respect to the conveying direction of the conveyor belt. The elongate lumps of material should be understood as meaning in particular the lumps of material which have an extent which could exceed the diameter of the closed tubular conveyor belt and therefore could lead to damage to the conveyor belt. When the elongate lumps of material strike against the conveyor belt, they are oriented in the conveying direction by the conveying speed of the conveyor belt such that damage to the conveyor belt by lumps of material lying on the conveyor belt transversely with respect to the conveying direction is reliably reduced. In particular for the filling of a conveyor belt which is subsequently shaped to form a tube, the arrangement of such a feeding mechanism has proven advantageous. The impact surface consisting of materials to be conveyed which have accumulated in the catching device furthermore ensures that the materials to be conveyed are deagglomerated, wherein, during the striking of the materials to be conveyed against the impact surface, the materials are distributed over the impact surface. Furthermore, the wear of the feeding mechanism is considerably reduced by means of such an impact surface since, after the materials to be conveyed have accumulated, the materials to be conveyed that pass the feeding mechanism preferably do not have any direct contact with the side walls and/or the base of the feeding mechanism.

According to a further aspect, a conveyor system for conveying materials to be conveyed comprises a conveyor belt, a feeding mechanism for feeding materials to be conveyed onto the conveyor belt, a belt system in which the conveyor belt is guided, wherein the belt system comprises a first belt-shaping device with which the conveyor belt is shaped from a substantially flat shape into a U shape until the feeding mechanism is reached, and therefore the materials to be conveyed can be brought into the U shape. The U shape has, in the conveying direction, a cross section which is constant with respect to the conveying direction, and the U shape is formed with two limbs and a base connecting the limbs such that the limbs are at an acute angle with respect to each other in the cross section of the conveyor belt, wherein the base comprises the angle apex, and wherein the belt system comprises a second belt-shaping device with which the conveyor belt can be shaped in the conveying direction after the feeding mechanism to form a closed tube. The design of the substantially flat conveyor belt has already been described previously and can also be used here. The feeding mechanism comprises an impact surface which is oriented at an angle of approximately 30°-60°, in particular 40°-50°, preferably approximately 45° with respect to the horizontal. Such an impact surface is, for example, a metal plate, in particular steel, wherein the impact surface is preferably formed in a substantially flat manner.

Such an impact surface likewise permits a pre-orientation of the materials to be conveyed, in particular elongate lumps of material (fish). This assists the orientation of the elongate lumps of material in the U-shaped belt in the direction of the conveyor belt, wherein the risk of lumps of materials to be conveyed lying transversely with respect to the conveying direction of the conveyor belt is reduced. An orientation of the impact surface at an angle of approximately 30°-60°, in particular 40°-50°, preferably approximately 45° with respect to the horizontal, has proven particularly favorable for the orientation of the lumps of material sliding on the impact surface in the direction of the conveyor belt, and therefore said lumps of material are oriented optimally in the direction of the conveyor belt.

According to a first embodiment, the impact surface extends in the conveying direction of the conveyor belt. That edge of the impact surface which points in the direction of the conveyor belt preferably extends parallel to the conveying direction of the conveyor belt. In particular, the feeding mechanism, preferably the collecting region of the feeding mechanism, extends in the conveying direction of the conveyor belt. The impact surface comprises an angle of inclination with respect to the horizontal of 30°-60°, preferably 40°-50°, most preferably 45°, in particular in the direction of the conveyor belt, and runs above the conveyor belt substantially parallel thereto. This permits optimum pre-orientation of the materials to be conveyed in a manner corresponding to the plane of the impact surface. In particular, the projection of the fall line of the material moving along the impact surface runs approximately perpendicularly to the extent of the conveyor belt.

According to a further embodiment, the feeding mechanism comprises a slideway, wherein the impact surface is arranged in the slideway. A slideway should be understood as meaning a means for the directed transport of the materials to be conveyed by means of gravity. For example, a slideway comprises a slide, a chute, a downpipe or a funnel.

According to a further embodiment, the impact surface is arranged inclined in the direction of the conveyor belt such that materials to be conveyed are directed from the impact surface, in particular directly, onto the conveyor belt. Following the impact surface, the materials to be conveyed are directed, for example, directly into the U-shaped portion of the conveyor belt. Further elements are preferably not arranged between the impact surface and the conveyor belt.

According to a further embodiment, a directing element is arranged between the impact surface and the conveyor belt such that materials to be conveyed are directed from the impact surface onto the directing element. The directing element is, for example, of plate-like design and fitted at the conveyor-belt-side end of the impact surface. From the directing element, the materials to be conveyed pass, preferably directly, onto the conveyor belt.

According to a further embodiment, the directing element is designed in such a manner that materials to be conveyed that slide along the directing element are oriented in the conveying direction of the conveyor belt and are preferably deflected. The directing element preferably comprises directing vanes or bulges which bring about an orientation of the materials to be conveyed in the conveying direction of the conveyor belt. For example, the directing vanes or bulges substantially describe a partially circular shape, preferably a quarter circle shape. Such a directing element brings about a reduction in the relative speed of the conveyor belt and of the materials to be conveyed when the materials to be conveyed strike against the conveyor belt. The wear and the loading of the conveyor belt are thereby reduced.

According to a further embodiment, the directing element comprises an angle of inclination which approximately corresponds to the angle of inclination of the impact surface. The directing element forms in particular an extension of the impact surface, wherein the pre-orientation of the materials to be conveyed is optimized. In particular, the directing element is oriented substantially parallel to the impact surface.

In particular, the impact surface is formed from a wear guard for a particle bed.

The present disclosure furthermore comprises a method for operating a conveyor system for conveying materials to be conveyed, wherein the conveyor system comprises a conveyor belt, a feeding mechanism for feeding materials to be conveyed onto the conveyor belt, and a belt system in which the conveyor belt is guided, with a first belt-shaping device for shaping the conveyor belt, wherein the conveyor belt is shaped from a substantially flat shape into a U shape until the feeding mechanism is reached, and after the feeding mechanism is shaped in the conveying direction with a second belt-shaping device to form a closed tube. In this case, the U shape has, in the conveying direction, a cross section which is constant with respect to the conveying direction, and the U shape is formed with two limbs and a base connecting the limbs in such a manner that the limbs are at an acute angle with respect to each other in the cross section of the conveyor belt, wherein the base comprises the angle apex. The materials to be conveyed drop into a catching region of the feeding mechanism, accumulate in the catching region and form an impact surface onto which the materials to be conveyed are fed.

The invention furthermore comprises a method for operating a conveyor system for conveying materials to be conveyed, wherein the conveyor system comprises a conveyor belt, a feeding mechanism for feeding materials to be conveyed onto the conveyor belt, and a belt system in which the conveyor belt is guided, with a first belt-shaping device for shaping the conveyor belt, wherein the conveyor belt is shaped from a substantially flat shape into a U shape until the feeding mechanism is reached, and after the feeding mechanism is shaped in the conveying direction with a second belt-shaping device to form a closed tube. In this case, the U shape has, in the conveying direction, a cross section which is constant with respect to the conveying direction, and the U shape is formed with two limbs and a base connecting the limbs in such a manner that the limbs are at an acute angle with respect to each other in the cross section of the conveyor belt, wherein the base comprises the angle apex. The materials to be conveyed fall onto an impact surface arranged in the feeding mechanism, wherein the impact surface comprises an angle of approximately 30°-60°, in particular 40°-50°, preferably approximately 45° to the horizontal.

According to an embodiment, the materials to be conveyed slide over the impact surface and, upon striking against the conveyor belt, are oriented in the conveying direction of the conveyor belt.

The advantages described with respect to the conveyor system apply in terms of method to the method for operating a conveyor system.

Figure 1:
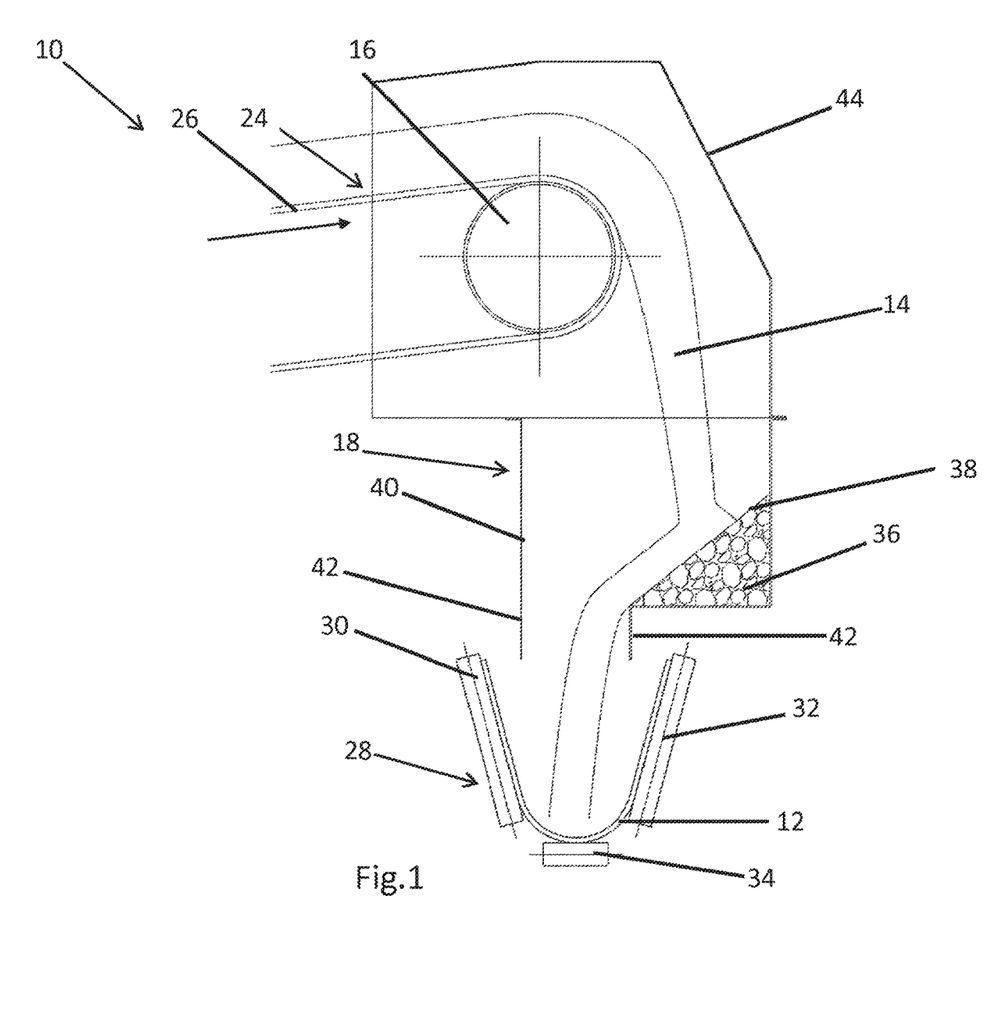
FIG. 1 is a schematic side view of an example conveyor system.

FIG. 1 shows a conveyor system 10 for conveying materials to be conveyed 14. The conveyor system 10 comprises a first conveyor device 24 with a belt conveyor 26 and a deflecting drum 16, via which the belt conveyor 26 is guided and is deflected at an angle of approximately 360°. The conveying direction of the belt conveyor 26 of the first conveyor device 24 is identified by an arrow. A second conveyor device 28 is arranged below the first conveyor device 24, said second conveyor device comprising a conveyor belt 12 and a belt system 48 in which the conveyor belt 12 is guided. The second conveyor device 28 has a conveying direction which extends substantially horizontally and orthogonally to the conveying direction of the first conveyor device 24. The second conveyor device 28 is arranged below the discharge end of the first conveyor device 24, wherein the discharge end is formed by the deflecting drum 16. A hood 44 which at least partially surrounds the upper side of the deflecting drum 16 is fitted above the discharge end.

Figure 2:
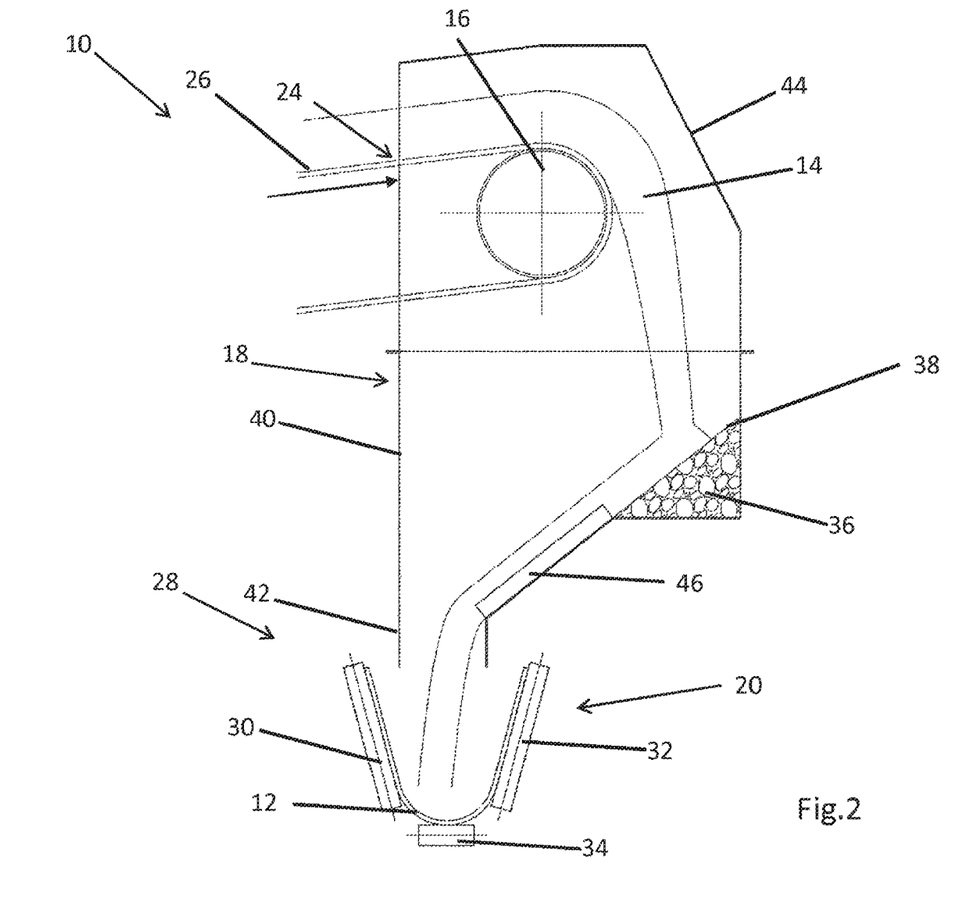
FIG. 2 is a schematic side view of another example conveyor system.

The belt system 48 for guiding the conveyor belt 12 of the second conveyor device 28 comprises a plurality of belt-shaping devices 20, 21 which are arranged one behind another in the conveying direction of the second conveyor device 28. Only a first belt-shaping device 20 is shown in the view of the conveyor system 10 that is illustrated in FIGS. 1 and 2, wherein each belt-shaping device 20, 21 comprises, for example, at least three rollers 30, 32, 34. The rollers are arranged relative to one another in such a manner that the conveyor belt resting on the rollers 30, 32, 34 is shaped to form a U.

The belt system 48 of the second conveyor device 28 is designed to shape the conveyor belt 12 from a substantially flat shape to form a tube. A substantially flat shape of the conveyor belt 12 means here that the conveyor belt 12 may comprise small bulges. This is firstly because the conveyor belt 12 coming from a belt-deflecting drum 17 (not illustrated) has a flowing profile to the first belt-shaping device 20. Secondly, because the center region of the belt-deflecting drum 17 may have a slightly different diameter than the edge region. The conveyor belt 12 is ideally completely flat when it is deflected by the belt-deflecting drum 17 and guided to the first belt-shaping device 20. For this purpose, the conveyor belt 12 is first of all shaped over the extent of the second conveyor device 28 by means of the first belt-shaping device 20 to form a U and subsequently by means of a second belt-shaping device 21 to form a closed conveyor tube, wherein the materials to be conveyed are arranged within the conveyor tube. The region of the second conveyor device 28, which region is arranged below the discharge end of the first conveyor device 24, comprises a conveyor belt 12 which is of U-shaped design. In the further extent of the second conveyor device 28, the conveyor belt 12 is shaped to form a closed tubular conveyor belt. The region in which the conveyor belt 12 has a tubular shape is not illustrated in FIGS. 1 and 2. For example, in the region in which the conveyor belt 12 has a tubular shape, the second belt-shaping device 21 comprises four rollers which are preferably arranged spaced apart uniformly circumferentially with respect to one another about the conveyor tube 12. According to the invention, at least three rollers are necessary, wherein the arrangement can be varied.

A feeding mechanism 18 is arranged between the discharge end of the conveyor belt 26 of the first conveyor device 24. The feeding mechanism 18 serves for feeding the materials to be conveyed 14 from the first conveyor device 24 onto the second conveyor device 28 and is arranged below the discharge end of the first conveyor device 24 in such a manner that materials to be conveyed drop from the discharge end of the first conveyor device 24 into the feeding mechanism 18. Below the discharge end of the first conveyor device 24, the feeding mechanism 18 comprises a catching region 36. The catching region is designed in such a manner that materials to be conveyed 14 from the first conveyor device 24 accumulate therein. In the exemplary embodiment of FIGS. 1 and 2, the catching region 36 has a box shape with a rectangular cross section. The materials to be conveyed which accumulate in the catching region form an impact surface 38 which can be acted upon by the materials to be conveyed of the first conveyor device 24. The impact surface 38 comprises an angle with respect to the horizontal of approximately 30-60°, in particular 40-50°, preferably approximately 45°.

The feeding mechanism furthermore comprises a housing 40 in which the collecting region is formed. Approximately vertical wall elements 42 which point with their lower end in the direction of the conveyor belt 12 are connected after the collecting region in the direction of flow of the materials to be conveyed 14. The wall elements 42 serve substantially for centering the feeding mechanism above the U-shaped region of the conveyor belt 12 of the second conveyor device 28.

During the operation of the conveyor device, the materials to be conveyed 14 are conveyed by the first conveyor device 24 in the conveying direction as far as the discharge end and drop into the feeding mechanism 18. Within the feeding mechanism, the materials to be conveyed 14 drop into the receiving region 36 and accumulate 14 therein in such a manner that the impact surface 38 is formed. The following materials to be conveyed strike against the impact surface 38 and are directed along the impact surface 38 in the direction of the second conveyor device 28. In particular, during the striking against the impact surface 38 and during sliding along the impact surface 38, elongate lumps of material (fish) are pre-oriented.

FIG. 2 shows a conveyor system 10 which substantially corresponds to the conveyor system 10 of FIG. 1 with the difference that a directing element 46 is arranged in the feeding mechanism 18 between the impact surface 38 and the U-shaped conveyor belt 12. The directing element 46 is arranged at an angle with respect to the horizontal of 30-60°, in particular 40-50°, preferably 45°. The directing element 46 comprises an angle of inclination which approximately corresponds to that of the impact surface 38. The materials to be conveyed are directed by the impact surface 38 directly onto the directing element 46 and are subsequently fed directly onto the conveyor belt. The directing element 46 furthermore comprises a plurality of directing vanes which are not illustrated in the view of FIG. 2. The directing vanes are arranged on the surface of the directing element 46 in such a manner that they bring about an orientation of the materials to be conveyed, that slide over the directing element 46, in the conveying direction of the conveyor belt 12. For example, the directing vanes are of approximately quarter-circle design.

The directing element 46 serves in particular to orient the materials to be conveyed 14 in the direction of the conveying direction of the conveyor belt 12 and therefore to reduce the relative speed of the materials to be conveyed 14 and of the conveyor belt 12 in the conveying direction during striking of the materials to be conveyed against the conveyor belt 12. This in particular reduces the wear and the loading of the conveyor belt 12 when the materials to be conveyed strike against the conveyor belt 12.

Figure 3:
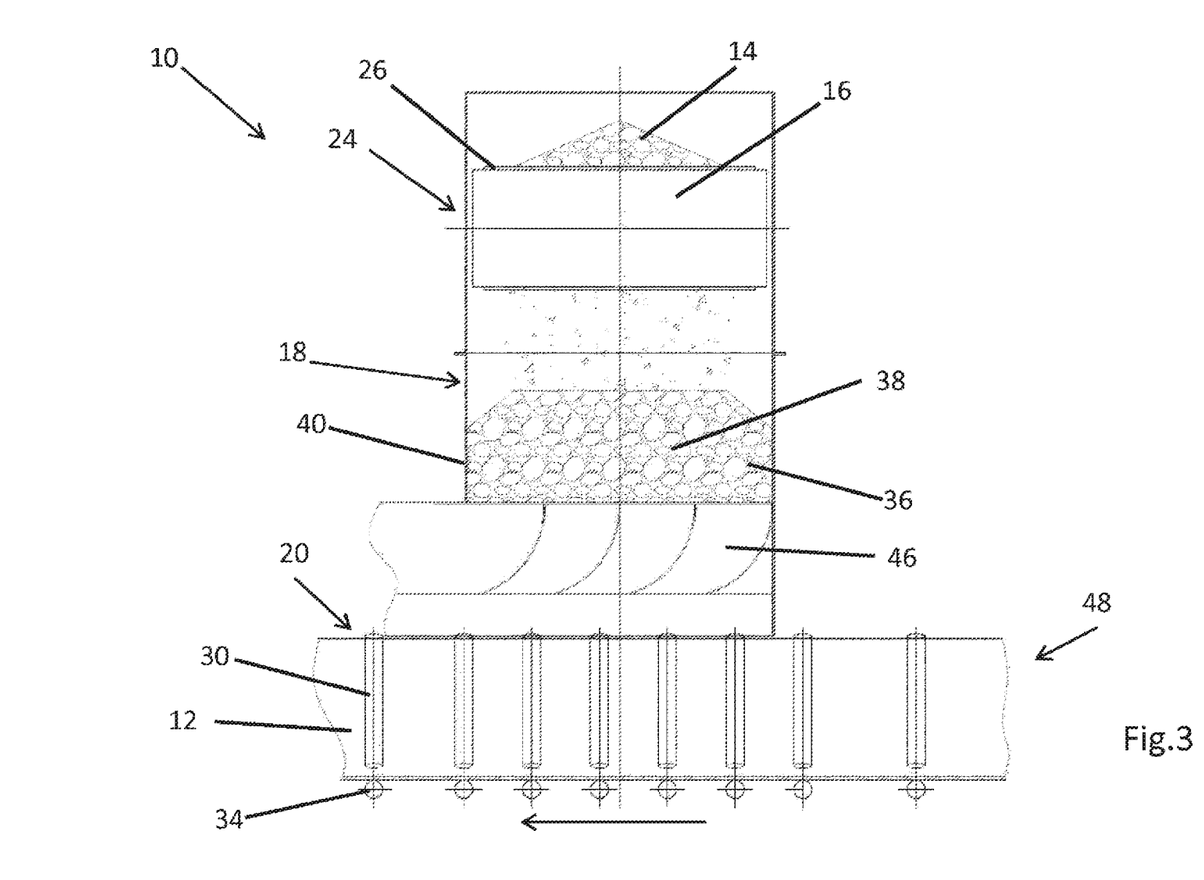
FIG. 3 is schematic side view of yet another example conveyor system.

FIG. 3 shows the conveyor system 10 of FIG. 2 in a further side view, wherein the elements of FIG. 2 have the same reference signs. In FIG. 3, the directing element 46 comprises a plurality of directing vanes which deflect the materials to be conveyed in the conveying direction of the conveyor belt 12. The conveying direction is illustrated by an arrow in FIG. 3. The directing vanes are of substantially partially circular design and deflect the materials to be conveyed at an angle of approximately 90°. The directing vanes are, for example, plates which are bent in a partially circular shape. In the exemplary embodiment of FIG. 3, the directing element 46 extends laterally in the conveying direction beyond the housing 40 of the feeding mechanism 18. For example, four such directing vanes are fitted on the directing element 46 in FIG. 3.

Figure 4:
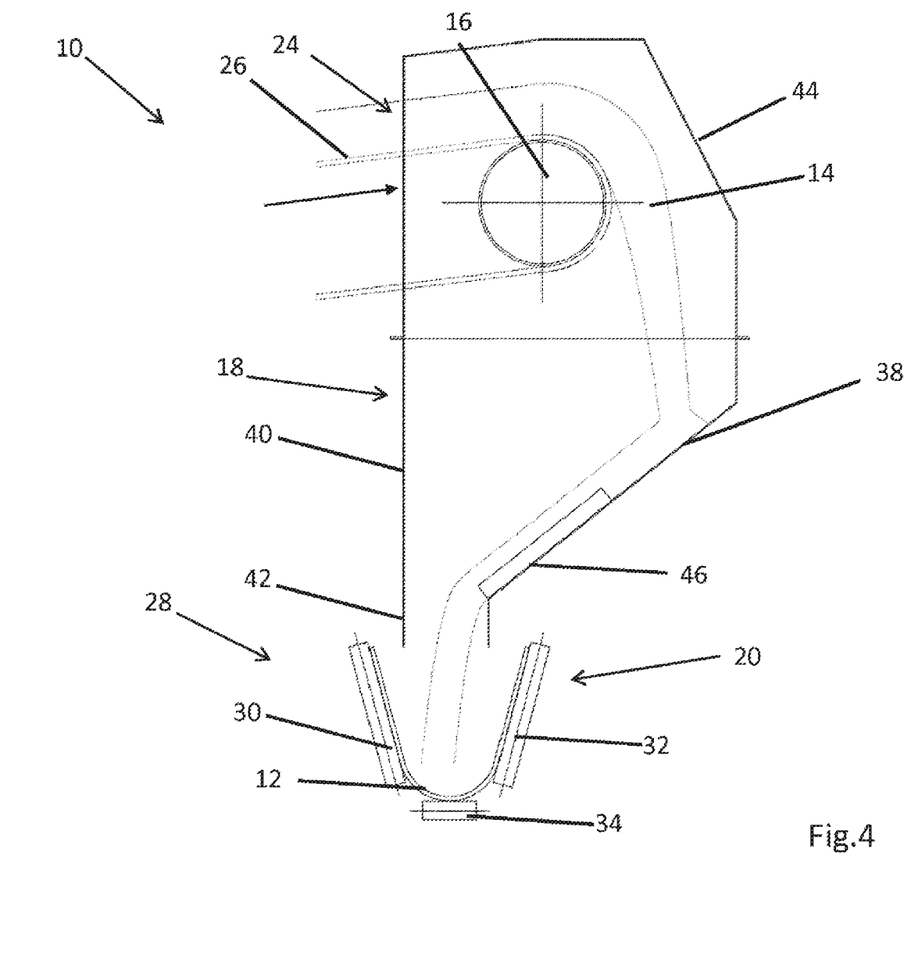
FIG. 4 is schematic side view of still another example conveyor system.

FIG. 4 shows a further exemplary embodiment of a conveyor system 10 which corresponds to the conveyor system 10 of FIGS. 1 to 3 with the difference that the conveyor system 10 of FIG. 4 does not comprise a collecting region 36. The impact surface 38 is formed by a side wall of the housing 40 of the feeding mechanism and is a substantially flat surface. The impact surface 39 comprises an angle with respect to the horizontal of 30-60°, in particular 40-50°, preferably 45°. The impact surface 38 is adjoined in the falling direction of the materials to be conveyed 14 by the directing element 46 which substantially corresponds to the directing element 46 of FIGS. 2 and 3.

Figure 5:
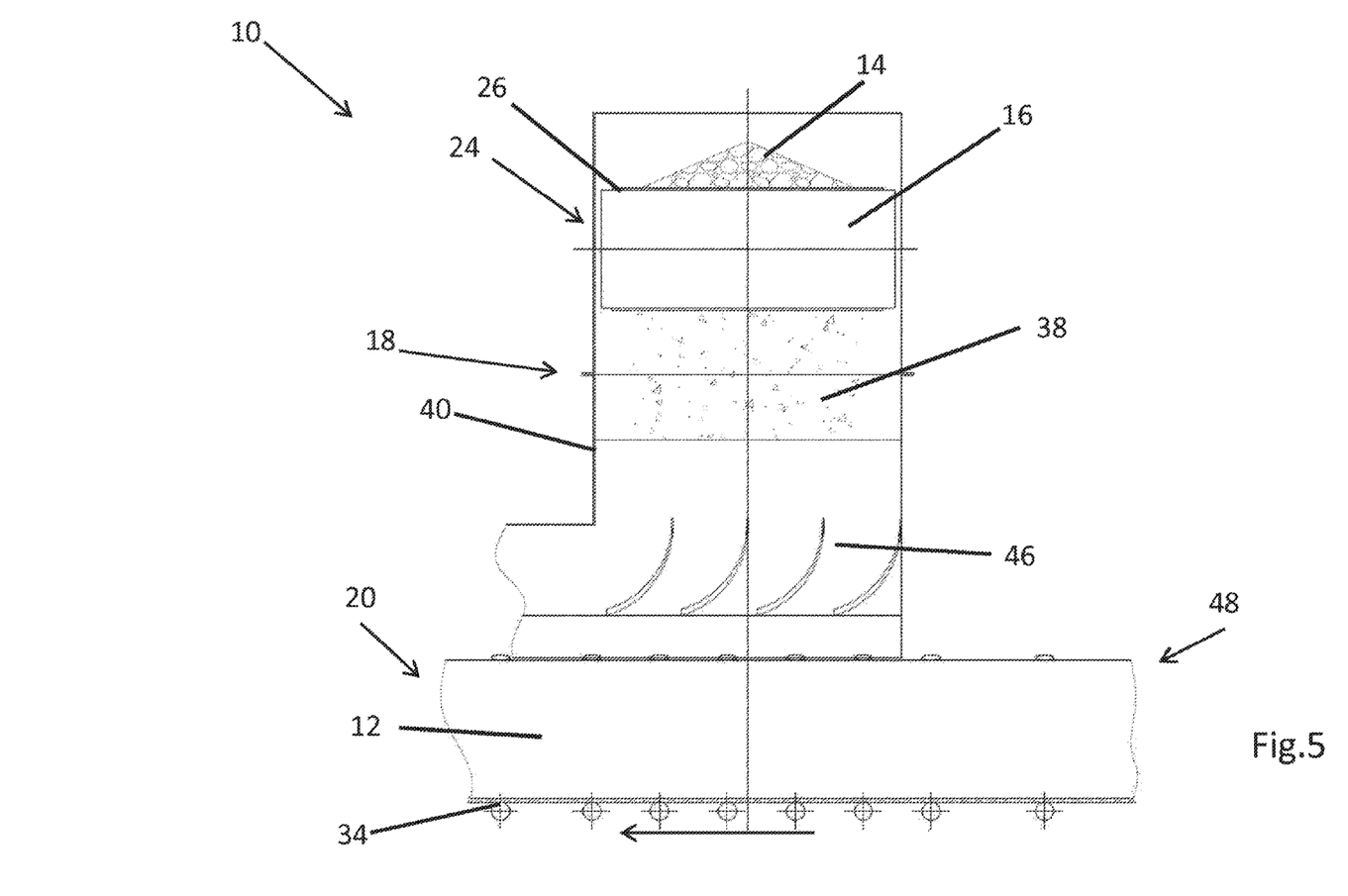
FIG. 5 is schematic side view of an example conveyor system.

FIG. 5 shows a further view of the conveyor system 10 according to FIG. 5, wherein the conveying direction of the conveyor belt 12 is illustrated by an arrow. It is schematically illustrated in FIG. 5 that the materials to be conveyed 14 slide along the impact surface 38 in the direction of the conveyor belt 12. The impact surface 38 extends in the direction of the conveyor belt or in the conveying direction of the conveyor belt 12, wherein that edge of the impact surface 38 which faces the conveyor belt 12 runs substantially parallel to the conveying direction. The projection of the fall line of the materials to be conveyed 12 that slide along the impact surface 38 is approximately orthogonal to the conveying direction. Following the impact surface 38, the materials to be conveyed 12 are deflected approximately by 90° in the direction of the conveying direction of the conveyor belt 12 by means of the directing vanes of the directing element 46.

Figures 6, 7, 8, 9, 10, 11:
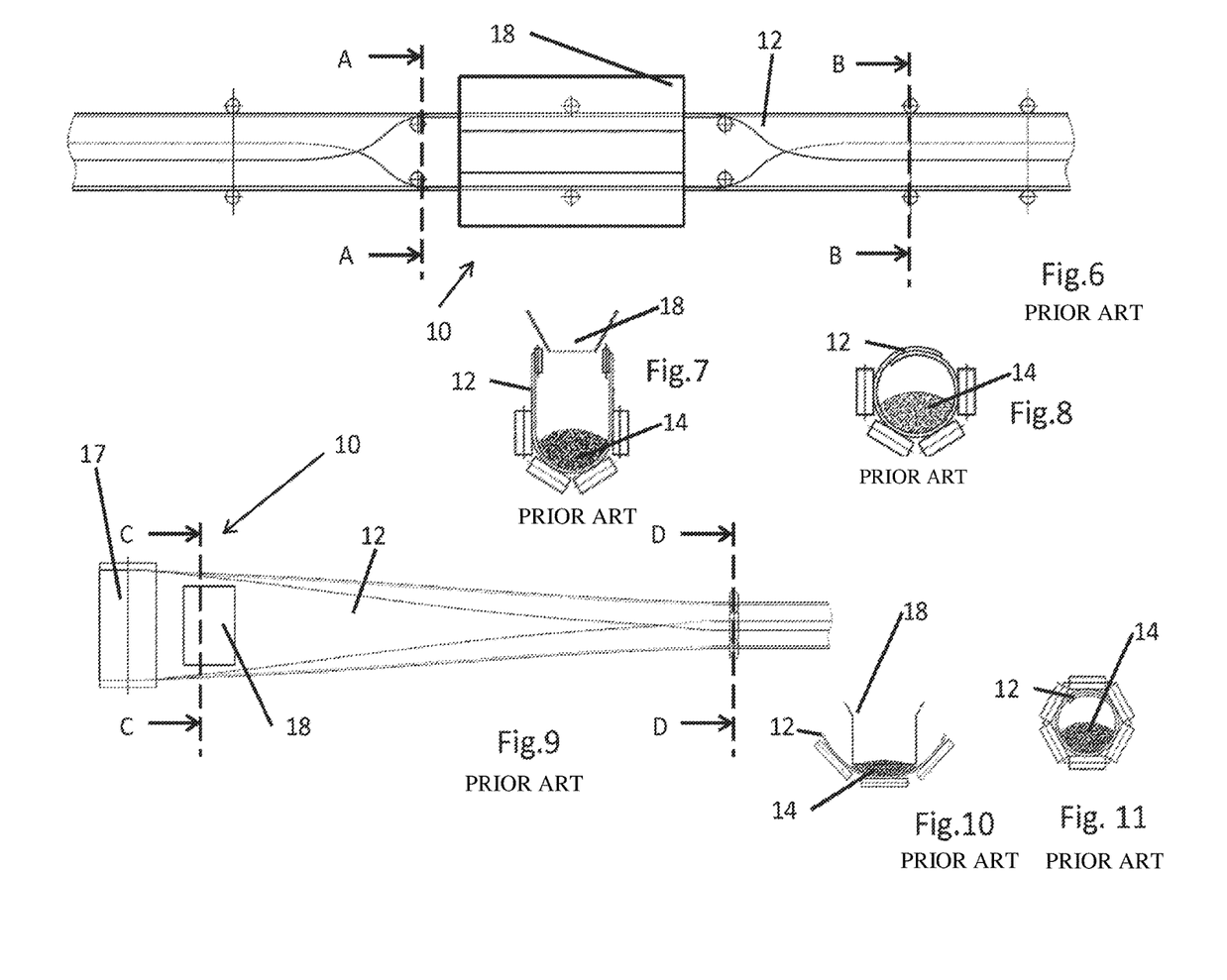
FIG. 6 is a schematic top view of a prior art conveyor system.
FIG. 7 is a sectional view of the intersecting plane A-A of the prior art conveyor system of FIG. 6.
FIG. 8 is a sectional view of the intersecting plane B-B of the prior art conveyor system of FIG. 6.
FIG. 9 is a schematic top view of another prior art conveyor system.
FIG. 10 is a sectional view of the intersecting plane C-C of the prior art conveyor system of FIG. 9.
FIG. 11 is a sectional view of the intersecting plane D-D of the prior art conveyor system according to FIG. 9.

FIG. 6 shows a schematic illustration of a conveyor system 10 in a top view according to the prior art. The conveyor belt 12 of the conveyor system 10 is pretensioned here in the transverse direction in such a flexible and curvature-generating manner that, in the case of the trough-shaped curvature of the central region, the two edge regions automatically lie in a folded-in manner. The conveyor belt 12 which is designed as a closed conveyor tube is opened into a U shape by spreading elements of the belt system engaging on the inner surface, which faces the materials to be conveyed 14, of the conveyor belt and spreading open the inner surface. Without said spreading elements, the spreading open is not possible because of the pretension of the conveyor belt 12. This step is illustrated in FIG. 7 as a sectional illustration of the intersecting plane A-A of the conveyor system according to FIG. 6. The materials to be conveyed 14 are input from the upwardly open side of the U-shaped conveyor belt 12 by means of a feeding mechanism 18. Subsequently, the conveyor belt is closed over the full circumference to form the conveyor tube. FIG. 8 shows this in the form of a sectional illustration of the intersecting plane B-B of the conveyor system according to FIG. 6.

FIG. 9 shows a schematic illustration of a conveyor system 10 in a top view according to the further prior art. The conveyor system 10 comprises a conveyor belt 12 which, coming from a belt-deflecting drum 17, increasingly takes up a U shape and, at a first belt-shaping device, finally takes up a closed conveyor tube shape. In the region of the U shape, materials to be conveyed 14 are fed onto the conveyor belt 12 by means of a feeding mechanism 18. FIG. 10 shows a sectional illustration of the intersecting plane C-C of the conveyor system 10 according to FIG. 9, wherein the materials to be conveyed 14 are fed, as previously mentioned, onto the materials to be conveyed 12. FIG. 11 shows a sectional illustration of the intersecting plane D-D of the conveyor system 10 according to FIG. 9, wherein the conveyor belt 12 comprises a closed conveyor tube shape which is filled with materials to be conveyed 14. The conveyor belt 12 is surrounded circumferentially here by rollers.

Figure 12:
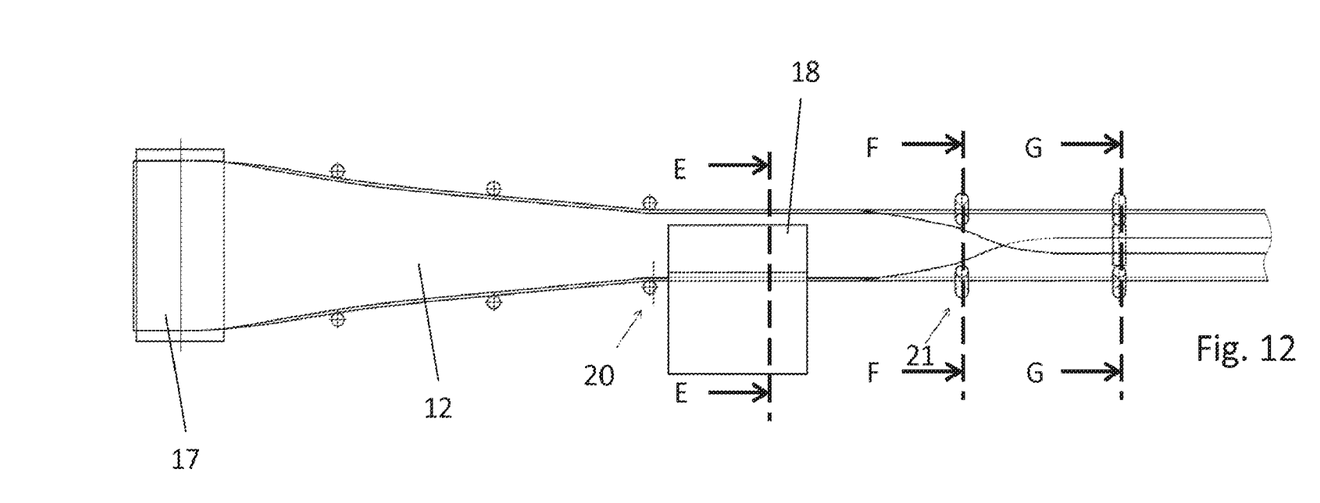
FIG. 12 is a schematic top view of an example conveyor system.
Figure 13:
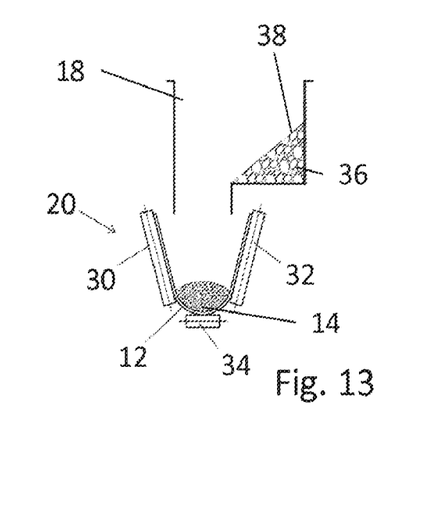
FIG. 13 is a sectional view of the intersecting plane E-E of the conveyor system according to FIG. 12.
Figure 14:
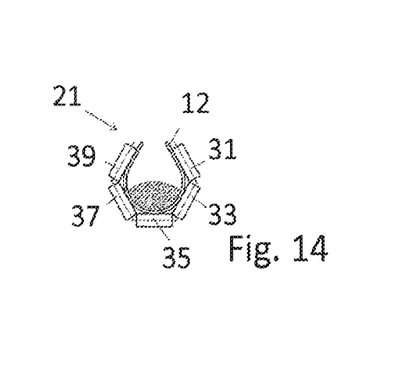
FIG. 14 is a sectional view of the intersecting plane F-F of the conveyor system according to FIG. 12.
Figure 15:
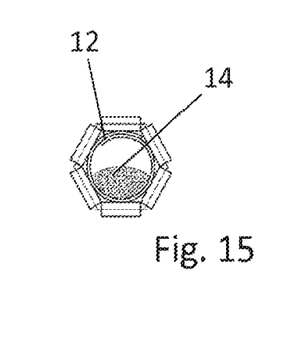
FIG. 15 is a sectional view of the intersecting plane G-G of the conveyor system according to FIG. 12.

FIG. 12 shows a schematic illustration of an embodiment generally according to the invention of a conveyor system 10 in a top view. The conveyor belt 12 has, coming from a belt-deflecting drum 17, a flowing profile, which becomes U-shaped, to a first belt-shaping device 20. The belt-shaping device 20 shapes the conveyor belt 12 with the aid of three rollers 30, 32, 34 in such a manner that it has a constant cross section over the further course. Materials to be conveyed 14 are fed into the U shape in this region of the constant cross section by means of a feeding mechanism 18. The feeding of the materials to be conveyed 12 is illustrated in FIG. 13 in the form of a sectional illustration of the intersecting plane E-E of the conveyor system 10. The U-shaped conveyor belt 12 is brought into a closed tubular shape with the aid of rollers 31, 33, 35, 37, 39 of a second belt-shaping device 21. The beginning of the closure of the U-shaped conveyor belt 12 is illustrated in the intersecting plane F-F of the conveyor system 10 in FIG. 14. FIG. 15 shows the closed tubular shape of the conveyor belt 12 in the form of a sectional illustration of the intersecting plane G-G of the conveyor system 10.

Furthermore, it is illustrated, inter alia, in FIGS. 12 and 13 that the U shape has, in the conveying direction, a cross section which is constant with respect to the conveying direction. Furthermore, the U shape is formed with two limbs and a base connecting the limbs in such a manner that the limbs are at an acute angle with respect to each other in the cross section of the conveyor belt, wherein the base comprises the angle apex.

LIST OF REFERENCE SIGNS

10 Conveyor system
12 Conveyor belt (tubular conveyor belt)
14 Materials to be conveyed
16 Deflecting drum
17 Belt-deflecting drum
18 Feeding mechanism
20 First belt-shaping device
21 Second belt-shaping device
22 Impact surface
24 First conveyor device
26 Belt conveyor
28 Second conveyor device
30 Roller of the first belt-shaping device
31 Roller of the second belt-shaping device
32 Roller of the first belt-shaping device
33 Roller of the second belt-shaping device
34 Roller of the first belt-shaping device
35 Roller of the second belt-shaping device
36 Collecting region
37 Roller of the second belt-shaping device
38 Impact surface
39 Roller of the second belt-shaping device
40 Housing
42 Wall elements
44 Hood
46 Directing element
48 Belt system

What is claimed is:

1. A conveyor system comprising:
a conveyor belt;
a feeding mechanism for feeding material to be conveyed onto the conveyor belt;
a belt system in which the conveyor belt is guided, wherein the belt system comprises:
a first belt-shaping device with which the conveyor belt is shaped from a substantially flat shape into a U shape configured to receive the material to be conveyed, wherein the U shape has in a conveying direction a cross section that is constant with respect to the conveying direction, the U shape comprising two limbs and a base connecting the limbs such that the limbs are disposed at an acute angle with respect to each other in the cross section of the conveyor belt, wherein the base comprises an apex of the acute angle, and
a second belt-shaping device with which the conveyor belt is configured to be shaped in the conveying direction downstream of the feeding mechanism to form a closed tube,
wherein each of the first and second belt-shaping devices include at least three rollers that shape the conveyor belt, wherein the rollers are disposed along a surface of the conveyor belt that faces away from the material to be conveyed, and
wherein the feeding mechanism comprises a catching region where the material to be conveyed accumulates and forms an impact surface onto which the material to be conveyed can be fed.

2. The conveyor system of claim 1 wherein the second belt-shaping device comprises five rollers.

3. The conveyor system of claim 1 wherein only the rollers that are disposed along the surface of the conveyor belt that faces away from the material to be conveyed shape the conveyor belt.

4. The conveyor system of claim 1 wherein the impact surface extends in the conveying direction of the conveyor belt.

5. The conveyor system of claim 1 wherein the feeding mechanism comprises a slideway in which the impact surface is disposed.

6. The conveyor system of claim 1 wherein the impact surface is inclined in the conveying direction of the conveyor belt such that the material to be conveyed is directed from the impact surface directly onto the conveyor belt.

7. The conveyor system of claim 1 comprising a directing element disposed between the impact surface and the conveyor belt such that the material to be conveyed is directed from the impact surface onto the directing element.

8. The conveyor system of claim 7 wherein the directing element is configured such that the material to be conveyed that slides along the directing element is oriented in the conveying direction of the conveyor belt.

9. The conveyor system of claim 7 wherein the directing element has an angle of inclination that corresponds to an angle of inclination of the impact surface.

10. The conveyor system of claim 1 wherein the feeding mechanism comprises an impact surface for receiving the material to be conveyed, the impact surface having an angle of between 30° to 60° relative to horizontal.

11. The conveyor system of claim 10 wherein only the rollers that are disposed along the surface of the conveyor belt that faces away from the material to be conveyed shape the conveyor belt.

12. The conveyor system of claim 10 wherein the feeding mechanism comprises a slideway in which the impact surface is disposed.

13. The conveyor system of claim 10 comprising a directing element disposed between the impact surface and the conveyor belt such that the material to be conveyed is directed from the impact surface onto the directing element.

14. The conveyor system of claim 13 wherein the directing element is configured such that the material to be conveyed that slides along the directing element is oriented in the conveying direction of the conveyor belt.

15. The conveyor system of claim 13 wherein the directing element has an angle of inclination that corresponds to an angle of inclination of the impact surface.

16. A method for operating a conveyor system for conveying material to be conveyed, the method comprising:
feeding the material to be conveyed from a feeding mechanism onto a conveyor belt;
shaping a portion of the conveyor belt that is proximate the feeding mechanism into a U shape with a first belt-shaping device, wherein the U shape has in a conveying direction a cross section that is constant with respect to the conveying direction, the U shape having two limbs connected by a base such that the limbs are at an acute angle with respect to one another and such that an apex of the acute angle is disposed at the base;
shaping a portion of the conveyor belt downstream of the feeding mechanism into a closed tube, and
dropping the material to be conveyed into a catching region of the feeding mechanism where the material accumulates and forms an impact surface onto which the material is fed.

17. The method of claim 16 comprising causing the material to be conveyed to slide over the impact surface such that, upon striking the conveyor belt, the material to be conveyed is oriented in the conveying direction of the conveyor belt.

18. The method of claim 16 comprising feeding the material to be conveyed onto an impact surface disposed in the feeding mechanism, the impact surface having an angle of between 30°-60° relative to horizontal.

\* \* \* \* \*